United States Patent [19]

MacDowell

[11] Patent Number: 5,112,777

[45] Date of Patent: May 12, 1992

[54] GLASS-CERAMIC-BONDED CERAMIC COMPOSITES

[75] Inventor: John F. MacDowell, Penn Yan, N.Y.

[73] Assignee: Corning Incorporated, Corning, N.Y.

[21] Appl. No.: 639,196

[22] Filed: Jan. 9, 1991

[51] Int. Cl.$^5$ .................... C03C 14/00; C03C 10/02
[52] U.S. Cl. ........................ 501/32; 501/10;
501/49; 501/77; 501/79
[58] Field of Search .............. 501/10, 32, 43, 49,
501/77, 79, 3, 4

[56] References Cited

U.S. PATENT DOCUMENTS 4,861,734 8/1989 MacDowell ...................... 501/10

*Primary Examiner*—Mark L. Bell
*Attorney, Agent, or Firm*—C. S. Janes, Jr.

[57] ABSTRACT

This invention is particularly directed to the production of glass-ceramics specifically designed for bonding hard refractory particulate ceramics into dense, mechanically strong composite bodies. The inventive glass-ceramics are crystallized in situ from divalent metal borate glasses. The invention is particularly drawn to composite articles where $Al_2O_3$ particles comprise the hard refractory ceramic and the inventive glasses react therewith to form an exceptionally strong bond therebetween accompanied with the development of divalent metal aluminoborate crystals.

6 Claims, No Drawings

GLASS-CERAMIC-BONDED CERAMIC COMPOSITES

BACKGROUND OF THE INVENTION

Composite bodies fabricated from mixtures of glass and crystalline particulates (ceramics) have been known commercially for a number of years, especially in the electronic packaging industry where glass has been commonly used as a flux to promote densification of alumina substrates. Because of the relatively low temperature softening points of glasses, research has been conducted over the years to devise thermally crystallizable glasses which, after sufficient fluxing to provide a bond for ceramic particles, would crystallize in situ to a glass-ceramic, thereby forming a composite body demonstrating higher refractoriness and greater mechanical strength than prior glass bonded bodies.

Numerous attempts to utilize glass-ceramics as bonds for particulate ceramics, most desirably alumina, have met with difficulties in achieving sufficient flow of the glass to provide strong bonding before crystallizing. Thus, prior to crystallizing, the glass must flow sufficiently to wet, encapsulate, and densify the crystalline ceramic particles.

Numerous potential applications for glass-ceramic-bonded ceramics have been investigated. For example, the oxidation of fibers (customarily resulting in embrittlement thereof) entrained within ceramic bodies might be reduced through the presence of the residual glassy phase following crystallization of the glass-ceramic bonding phase. Furthermore, glass-ceramic-bonded refractory phases, e.g., $Al_2O_3$, $ZrO_2$, $Si_3N_4$, cordierite, etc., should permit lower sintering and hot pressing temperatures with increased mechanical strength and toughness, while still maintaining high use temperatures. Yet another possible application contemplates the inclusion of highly refractory particulate materials, such as $Al_2O_3$ and/or $ZrO_2$, as fillers in glassceramic coatings, which coatings should provide excellent barriers on metals or other substrates to attack by oxygen and hydrogen. Finally, a recent application has had the goal to extend the useful life of abrasive products, specifically grinding wheels and more especially grinding wheels wherein particulated $Al_2O_3$ comprises the abrasive grain, by employing a glass-ceramic bond, instead of a glass bond, for the abrasive particles.

As was observed above, numerous attempts have been made in the past to utilize glass-ceramics as bonding materials for particulate ceramics. One example of that research is disclosed in U.S. Pat. No. 4,861,734 (MacDowell). Thus, that patent is directed to the manufacture of glass-ceramic bodies through the sintering of glass powders into an integral body accompanied with the development of crystals therein. The glasses were selected from the following composition intervals expressed in terms of weight percent on the oxide basis:
  (a) 20-30% CaO, 35-55% $Al_2O_3$, and 20-40% $B_2O_3$;
  (b) 30-45% SrO, 30-45% $Al_2O_3$, and 20-35% $B_2O_3$;
  (c) 40-55% BaO, 25-40% $Al_2O_3$, and 15-30% $B_2O_3$; and
  (d) mixtures thereof.

In the preferred composition, the alkaline earth metal oxide, $Al_2O_3$, and $B_2O_3$ will be in an essentially 1:1:1 stoichiometry. The patent observed that the glass powders sintered into an integral body and crystallized in situ almost concurrently. That is, by the time the glass powders had sintered into an integral body, that body was substantially fully crystallized. Accordingly, whereas the glass powders described in the patent were useful in sealing applications, their viscosity characteristics did not recommend their utility in forming glass-ceramic-bonded ceramic composites.

Therefore, the principal objective of the instant invention was to develop glass compositions demonstrating physical properties, particularly viscosity characteristics, rendering them eminently suitable for forming glass-ceramic-bonded ceramic bodies and, more specifically, for forming glass-ceramic-bonded particulate $Al_2O_3$ bodies.

SUMMARY OF THE INVENTION

Laboratory investigations have demonstrated that the above objective can be achieved in glasses having base compositions within the $RO-B_2O_3$ system, wherein RO is a divalent metal oxide selected from the group consisting of CaO, SrO, BaO, MnO, ZnO, and mixtures thereof. As expressed in terms of weight percent on the oxide basis, the base compositions for the inventive glasses consist essentially of 25-65% B 03 and 20-75% RO, the sum of $B_2O_3$+RO constituting at least 55% of the total composition. Upon heat treatment, crystals of a divalent metal borate are developed in situ. As optional ingredients, up to 20% $SiO_2$, up to 40% $Al_2O_3$, up to 25% MgO, up to 10% $ZrO_2$, and up to 15% F. may be present.

Sintering temperatures no higher than about 700° C are operable with certain of the inventive glasses. As can be appreciated, the temperature required for satisfactory sintering and glass flow is dependent upon the composition of the glass. It can further be appreciated that, as the temperature for firing is raised, the energy consumed increases and, hence, the cost inherent in the sintering process increased. Accordingly, firing temperatures no higher than 1400° C. are preferred.

The inclusion of $Al_2O_3$ in the glass compositions is highly desirable to assure the development of crystals exhibiting high refractoriness. However, when $Al_2O_3$ is included in the glass composition at levels in excess of 20%, at least 2% F and/or 10% SiO will most desirably be present to enable the use of sintering temperatures no higher than about 1400° C. In the absence of F and/or $SiO_2$, such higher $Al_2O_3$ levels can necessitate firing temperatures of up to 1600° C. Nevertheless, as was explained above in the review of U.S. Pat. No. 4,861,734, glasses containing high levels of $Al_2O_3$, viz., at least 25% $Al_2O_3$, crystallize substantially concurrently with the sintering of the glass powders into an integral body. The inclusion of F and/or $SiO_2$ increases the flow of the glass prior to its crystallization, thereby assuring a homogeneous, dense body. Therefore, the inclusion of F and/or $SiO_2$ in glass compositions of high $Al_2O_3$ concentrations constitutes the preferred practice.

The presence of $ZrO_2$ in the inventive base glass composition likewise leads to the development of crystals demonstrating high refractoriness in the glass-ceramic body (most frequently $ZrO_2$ crystals). The dissolution of $ZrO_2$ in the glass melt is relatively low, however, so the total content employed will generally be held to be no higher than about 10%.

Whereas the most desirable physical properties will typically be exhibited in those glass compositions consisting essentially solely of RO and $B_2O_3$ with, optionally, $SiO_2$, $ZrO_2$, $Al_2O_3$, MgO, and/or F, minor amounts, generally less than 10% total, of compatible metal oxides may be included. To illustrate, such additions as $La_2O_3$, $Y_2O_3$, $CeO_2$, PbO, and $TiO_2$ can modify the properties demonstrated by the glass and those of the final composite body. Care must be taken in including extraneous materials, however, to avoid the development of a low melting glassy (uncrystallized) phase in the final product. Inasmuch as the alkali metal oxides are strong fluxes and their presence deleteriously affects the electrical properties and stability at high temperatures, their essential absence is greatly preferred.

It will be appreciated that, where desired, refractory fillers in the form of particulates, fibers, and whiskers can be included in the final composite product to vary the physical properties thereof; for example, fibers and/or whiskers may be entrained to provide reinforcement.

The use of $Al_2O_3$-containing glasses was conjectured to provide two advantages when used in bonding $Al_2O_3$ particles into a composite article:

(1) such glasses exhibit coefficients of thermal expansion below that of alumina, thereby permitting the production of composite bodies compatible with a wide variety of materials, including silicon; and (2) the substantial presence of $Al_2O_3$ in the glass would lead to excellent bonding between the glass and the particulate $Al_2O_3$. The first advantage was realized. It was discovered, however, that the binary $RO-B_2O_3$ glasses resulted in more extensive fluxing action during the sintering process than the $Al_2O_3$-containing glasses, with consequent greater bonding as compared to the $Al_2O_3$-containing glasses. In addition, the intergranular aluminoborate glass resulting from the borate glass dissolution of the $Al_2O_3$ particles crystallizes to an essentially 1:1:1 $RO:Al_2O_3:B_2O_3$ stoichiometry glass-ceramic during the final firing of the particulate mixture. Accordingly, whereas the final product is identical to that derived by sintering frit mixtures of $Al_2O_3$ and a $RO-Al_2O_3-B_2O_3$ glass, the greater reaction taking place between a binary borate glass and particulate $Al_2O_3$ assures more wetting and better bonding therebetween. Consequently, the use of $RO-B_2O_3$ glasses, rather than $Al_2O_3$-containing glasses, comprises the preferred practice of the invention when bonding of particulate $Al_2O_3$ is contemplated.

The method for preparing the inventive composites comprises general steps:

(1) a batch for a glass having a predetermined composition is melted;

(2) that melt is cooled to a glass body and that body is comminuted to a finely-divided powder;

(3) that powder is blended thoroughly with a finely-divided, hard refractory particulate ceramic material to form a homogeneous mixture of the powders;

(4) that mixture of powders is shaped into a body of a desired configuration; and (5) that body is heated to a temperature and for a time sufficient to sinter the glass particles together into an integral body and wet the particles of ceramic material sufficiently to develop a strong bond between the glass and the ceramic material and to cause the generation of divalent metal borate crystals with, optionally, divalent metal aluminoborate or aluminate crystals as the predominant crystal phase.

As observed earlier, temperatures as low as 700° C. can be satisfactory for some glasses. Nevertheless, as is recognized in the art, sintering, crystallization, and matrix-filler reactions typically take place more rapidly as the temperature is increased. Hence, temperatures as high as 1600° C. can be used with certain compositions to produce dense, glass-ceramic-bonded composites. Likewise, as will also be recognized, the time required in the firing process is a function of the temperature employed. Periods of time ranging about 0.5–4 hours have proven to be operable. Where desired, however, longer heat treating periods, e.g., 8–24 hours, may be utilized, such longer periods frequently leading to more extensive reaction of the glass with the ceramic phase, followed by more complete crystallization of the glass which is generally accompanied by some improvement in the properties demonstrated by the composite bodies.

PRIOR ART

In addition to U.S. Pat. No. 4,861,734 which was discussed above in some detail and is believed to constitute the most relevant disclosure, the patents reviewed below in brief are also considered to relate to the instant invention.

U.S. Pat. No. 2,899,322 (Verwey) discloses borate-based glasses for optical applications containing CdO, $La_2O_3$, $Ta_2O_5$, and $ZrO_2$. No reference is made therein to glass-ceramics.

U.S. Pat. No. 3,899,340 (Malmendier) describes the preparation of glass-ceramic bodies exhibiting high elastic moduli, the bodies consisting essentially, in weight percent, of 5–25% MgO, 10–45% $Al_2O_3$, and 20–45% $B_2O_3$ with, optionally, up to 50% by weight total of a high field strength modifier in the indicated preparation selected from the group consisting of 0–10% $TiO_2$, 0–40% $Ta_2O_5$, 0–50% $La_2O_3$, 0–25% $CeO_2$, 0–10% $ZrO_2$, 0–35% $Y_2O_3$, and 0–15% BeO. The crystal phases developed therein were identified as aluminoborate and magnesium aluminoborate solid solutions. No reference was made to sintering glass powders into an integral body and causing the growth of crystals therein. Instead, a bulk precursor glass body was formed and that body crystallized in situ via heat treatment. The presence of alkaline earth metal oxides other than MgO was explicitly warned against inasmuch as they reduce the elastic moduli of the articles.

U.S. Pat. No. 3,948,669 (Brydges et al) records the production of glass-ceramic articles containing single crystal rutile fibers demonstrating high aspect ratios with another minor crystal phase identified as $Al_4B_2O_9$. Those glass-ceramics consisted essentially, in weight percent, of 45–65% $B_2O_3$, 5–30% $Al_2O_3$, 5–30% $TiO_2$, and 3–30% RO, wherein RO is an alkaline earth metal oxide. No mention is made of sintering glass powders into an integral body and causing the development of crystals therein. Moreover, the crystal phases generated were different from those formed in the present inventive materials.

U.S. Pat. No. 4,049,872 (Hang) reports the preparation of thermally devitrifying glass sealing frits consisting essentially, in weight percent, of 10-20% BaO, 10-11% $Li_2O$, 2-7% $Al_2O_3$, and 66-77% $B_2O_3$, wherein the crystal phase generated is $Li_2O-B_2O_3$. Whereas the sintering of glass powders (frits) is cited, the starting compositions and the final products are quite unlike those of the present invention.

U.S. Pat. No. 4,291,107 (Barry et al.) discusses glass compositions for use in sealing $\beta$-alumina tubes in sodium-sulphur batteries. The glasses consist essentially, in mole percent, of 28–48% $B_2O_3$, 0–20% $SiO_2$, 40–60% $B_2O_3+SiO_2$, 16–28% $Al_2O_3$, and 18–33% alkaline earth metal oxide. Whereas the sintering of glass powders is disclosed, there is no reference to crystals being developed therein during the sealing operation.

U.S. Pat. No. 4,341,849 (Park et al.) also relates to glasses designed for sealing β-alumina tubes in sodium-sulphur batteries. The glasses are expressly stated to be resistant to devitrification and consist, in weight percent, of 10-30% $Al_2O_3$, 35-50% $B_2O_3$, 15-40% total alkaline earth metal oxides in the indicated proportions of 2-15% of CaO, 2-15% SrO, and 2-15% BaO, 0-20% $SiO_2$, and 5% total of $LiO_2$ and/or $Na_2O$ and/or $K_2O$. The resistance of the glasses to devitrification quite apparently places them outside of the present inventive glasses.

DESCRIPTION OF PREFERRED EMBODIMENTS

Table I recites several glass forming compositions, expressed in terms of parts by weight on the oxide basis, illustrating the invention. The fluoride content is reported as being in excess of the oxide components. Because the sum of the components, including the fluoride, totals or closely approximates 100, for all practical purposes the reported individual values may be deemed to reflect weight percent. The actual batch ingredients may comprise any materials, either the oxides or other compounds, which, when melted together, will be converted into the desired oxide in the proper proportions. For example, $CaCO_3$, $SrCO_3$, and $BaCO_3$ can conveniently constitute the source of CaO, SrO, and BaO, respectively, and fluoride can be included through such compounds as $CaF_2$, $BaF_2$, and $AlF_3$.

The batch materials were compounded, ballmilled together to aid in securing a homogeneous melt, and charged into platinum crucibles. After placing lids thereon, the crucibles were moved into furnaces operating at temperatures between 1300°-1600° C. for times of about 1-2 hours.

To reduce the time and energy required to comminute the glass to finely-divided particles, the melt was poured as a relatively fine stream into a water bath. This practice, termed "drigaging", breaks up the stream of molten glass into small particles which can thereafter be milled to the desired particle size. Another technique used for accomplishing the same purpose involves running a stream of molten glass between metal rollers to form a thin ribbon of glass which can then be crushed and milled to the desired particle size. In most of the reported examples the melts were drigaged or run through rollers to form thin ribbon. Sometimes part of the melt was poured into a steel mold to form a 2" (~5.1 cm) square of glass which was transferred immediately to an annealer operating between 500°-600° C.

The drigaged fragments and ribbon were comminuted to powders having an average particle diameter between about 5-50 microns through ballmilling utilizing $Al_2O_3$ cylinders as the milling media and methanol as the milling aid. After drying, the glass powders were thoroughly mixed with finely-divided ceramic materials having average particle diameters ranging between about 5-250, microns in a vibratory mixer.

To investigate the sintering and crystallization properties of the glass powder mixtures, 0.5" (~1.3 cm) diameter discs weighing about 2.5 grams were dry pressed at about 2000 psi and fired in an electrically heated furnace at temperatures between 800°-1400° C. for times ranging about 1-8 hours, the temperature within the furnace being raised at rates varying over the interval of about 1-5° C./minute. At the conclusion of the heat treatment, the electric current to the furnace was cut off and the discs permitted to cool therewithin. This practice, termed "cooling at furnace rate", averaged about 3°-5° C./minute. Powder mixtures demonstrating good sintering behaviors, i.e., good flow prior to crystallization thereby producing bodies of high density, were pressed into bars having dimensions approximating 3"×0.25"×0.25" (~7.6×0.6×0.6 cm) for measurements of linear coefficient of thermal expansion and modulus of rupture, and/or into discs having diameters of approximately 1.75" (~4.4 cm) and thicknesses of approximately 0.125" (~0.3 cm) for measurements of electrical properties.

TABLE I

|  | 1 | 2 | 3 | 4 | 5 | 6 |
|---|---|---|---|---|---|---|
| $B_2O_3$ | 57.8 | 31.2 | 46.6 | 36.4 | 50.3 | 31.2 |
| ZnO | — | — | — | 42.6 | 29.4 | — |
| SrO | 1.5 | — | 34.7 | — | — | — |
| CaO | 40.7 | — | 18.7 | — | 20.2 | — |
| BaO | — | 68.8 | — | — | — | 68.8 |
| MgO | — | — | — | 21.1 | — | — |
| F | — | — | — | — | — | 10.0 |

|  | 7 | 8 | 9 | 10 | 11 | 12 |
|---|---|---|---|---|---|---|
| $B_2O_3$ | 55.4 | 47.6 | 63.3 | 49.6 | 55.2 | 27.3 |
| ZnO | — | — | — | 29.0 | 25.8 | — |
| SrO | — | — | — | — | — | 60.9 |
| CaO | 44.6 | — | — | — | — | — |
| BaO | — | 52.4 | — | — | — | — |
| MnO | — | — | 36.7 | — | — | — |
| $SiO_2$ | — | — | — | 21.4 | 19.0 | 11.8 |
| F | 10.0 | — | — | — | — | — |

|  | 13 | 14 | 15 | 16 | 17 | 18 |
|---|---|---|---|---|---|---|
| $B_2O_3$ | 50.3 | 42.9 | 20.2 | 27.9 | 33.6 | 27.7 |
| ZnO | 29.4 | 25.1 | — | — | — | — |
| SrO | — | 32.0 | — | 41.5 | 50.0 | 20.6 |
| CaO | 20.3 | — | 33.6 | — | — | 11.1 |
| $SiO_2$ | — | — | 17.5 | — | — | — |
| F | — | 5.0 | 5.0 | — | 5.0 | — |
| $Al_2O_3$ | — | — | 29.7 | 30.0 | 16.4 | 40.0 |

Table II records the temperature in °C. at the dwell time in hours at temperature employed in the heat treatment applied to the disc and bar samples, an identification of the ceramic material used in conjunction with the ratio of ceramic:glass, a visual description of the resulting body, and, where measured, the linear coefficient of thermal expansion (Exp.) expressed in terms of $\times 10^{-7}$/°C., the modulus of rupture (MOR) expressed in terms of Ksi, the dielectric constant (D.C.) and loss tangent (L.T.) determined at room temperature (~22° C.) and 10 KHz, the electrical resistivity determined at 250° C. expressed as Logρ, and the linear shrinkage expressed in terms of %. (It will be observed that in one instance the body experienced expansion, that is, it foamed, rather than shrunk.)

TABLE II

| Example | Heat Treat. | Ceramic:Glass | Description |
|---|---|---|---|
| 1 | 900°-1 hr. | $Al_2O_3$ 50:50 | Dense, white, partly glazed |
| 1 | 850°-1 hr. | $Al_2O_3$ 50:50 | Dense, white, partly glazed |
| 2 | 950°-1 hr. | $Al_2O_3$ 50:50 | Dense, light brown |
| 3 | 900°-1 hr. | $Al_2O_3$ 50:50 | Dense, white, very slight craze |
| 4 | 900°-1 hr. | $Al_2O_3$ 60:40 | — |
| 4 | 900°-1 hr. | $Al_2O_3$ 50:50 | Dense, white, textured glaze |
| 4 | 900°-1 hr. | $Al_2O_3$ 40:60 | Dense, white, thin glaze |
| 5 | 900°-1 hr. | $Al_2O_3$ 40:60 | Dense, white |

TABLE II-continued

| | | | | | |
|---|---|---|---|---|---|
| 5 | 900°-1 hr. | Al$_2$O$_3$ | 50:50 | Dense, white, thick glaze | |
| 6 | 1400°-1 hr. | Al$_2$O$_3$ | 80:20 | Dense, white | |
| 6 | 1300°-1 hr. | Al$_2$O$_3$ | 70:30 | Dense, white | |
| 7 | 800°-1 hr. | Al$_2$O$_3$ | 50:50 | White, porous skin | |
| 7 | 1400°-1 hr. | Al$_2$O$_3$ | 90:10 | Dense, white | |
| 7 | 1300°-1 hr. | Al$_2$O$_3$ | 70:30 | Dense, white | |
| 8 | 1300°-1 hr. | Al$_2$O$_3$ | 70:30 | Dense, white, crazed | |
| 9 | 1300°-1 hr. | Al$_2$O$_3$ | 70:30 | Dense, dark brown, slightly porous | |
| 10 | 800°-1 hr. | Al$_2$O$_3$ | 50:50 | Dense, white, matte | |
| 11 | 900°-1 hr. | Al$_2$O$_3$ | 50:50 | Dense, white, some gloss | |
| 12 | 1200°-4 hrs. | Al$_2$O$_3$ | 80:20 | — | |
| 12 | 1300°-4 hrs. | Al$_2$O$_3$ | 80:20 | Dense, off-white, tough | |
| 13 | 900°-1 hr. | Al$_2$O$_3$ | 40:60 | Dense, white, slightly porous | |
| 13 | 900°-1 hr. | Al$_2$O$_3$ | 50:50 | Dense, white thick glaze | |
| 14 | 800°-1 hr. | Al$_2$O$_3$ | 50:50 | Dense, white thin glaze | |
| 15 | 1000°-1 hr. | ZrO$_2$ | 50:50 | Dense, ivory | |
| 15 | 1000°-1 hr. | ZrO$_2$ | 40:60 | Dense, ivory | |
| 15 | 1000°-1 hr. | ZrO$_2$ | 30:70 | Dense, ivory, slightly porous | |
| 16 | 750°-1 hr. | TiN | 50:50 | Dense, brown, slightly porous | |
| 16 | 900°-1 hr. | TiN | 50:50 | Dense, yellow-brown, slight delamination | |
| 16 | 900°-1 hr. | Si$_3$N$_4$ | 50:50 | Light gray, non-porous | |
| 16 | 900°-1 hr. | TiB$_2$ | 50:50 | Dense, gray, tough | |
| 17 | 900°-1 hr. | TiN | 50:50 | Dense, yellow-brown, slight delamination | |
| 17 | 900°-1 hr. | SiC | 50:50 | Medium-coarse, black foam | |
| 17 | 750°-1 hr. | TiB$_2$ | 50:50 | Dense, gray-black, tough | |
| 18 | 750°-1 hr. | SiC | 50:50 | Dense, brown, slightly porous | |

| Example | Exp. | MOR | D.C. | L.T. | Logρ | Shrink |
|---|---|---|---|---|---|---|
| 1 | 66.8 | — | — | — | — | 10.0 |
| 1 | 66.8 | 13.3 | — | — | — | — |
| 2 | 38.7 | — | — | — | — | — |
| 3 | 30.7 | — | — | — | — | — |
| 4 | 66.0 | 22.2 | — | — | — | — |
| 4 | 65.3 | — | 4.67 | <0.001 | 15.23 | 9.0 |
| 4 | — | — | 6.39 | <0.001 | 15.37 | 13.0 |
| 5 | — | — | 6.31 | <0.001 | 16.22 | 13.8 |
| 5 | 61.3 | — | 6.30 | 0.002 | 15.35 | 14.5 |
| 6 | — | 17.7 | — | — | — | 11.4 |
| 6 | 68.8 | — | — | — | — | — |
| 7 | — | 12.6 | — | — | — | — |
| 7 | — | 18.0 | — | — | — | — |
| 7 | 68.8 | — | — | — | — | — |
| 8 | — | 11.3 | — | — | — | 10.0 |
| 9 | — | 11.9 | — | — | — | 7.6 |
| 10 | 51.0 | — | 5.84 | 0.004 | 14.55 | 15.8 |
| 11 | — | — | 6.21 | 0.002 | 13.79 | 15.0 |
| 12 | — | 13.3 | — | — | — | — |
| 12 | — | 24.1 | — | — | — | 14.0 |
| 13 | — | — | 6.57 | <0.001 | 13.93 | 11.0 |
| 13 | — | — | 6.50 | <0.001 | 16.08 | 14.6 |
| 14 | — | — | 6.79 | <0.001 | 13.90 | 14.8 |
| 15 | — | — | — | — | — | — |
| 15 | — | — | — | — | — | — |
| 15 | — | — | — | — | — | — |
| 16 | 49.5 | — | — | — | — | 10.8 |
| 16 | 60.6 | — | — | — | — | 11.0 |
| 16 | — | — | — | — | — | 0.0 |
| 16 | 54.8 | — | — | — | — | 11.0 |
| 17 | 65.8 | — | — | — | — | 11.4 |
| 17 | — | — | — | — | — | +14.0* |
| 17 | 71.5 | — | — | — | — | 11.0 |
| 18 | — | — | — | — | — | 9.0 |

*Body foamed.

As can be observed through a study of Tables I and II, the present invention provides dense glass-ceramic-ceramic composite bodies exhibiting high mechanical strengths from a relatively wide variety of hard refractory ceramics utilizing a relatively narrow range of thermally crystallizable glass compositions. The very high mechanical strengths demonstrated by the sintered glass-ceramic-bonded Al$_2$O$_3$ particulates strongly recommends the inventive thermally crystallizable glasses as bonding media for grinding wheels where Al$_2$O$_3$ particles constitute the abrasive material.

A comparison of Example 17, wherein SiC comprised the particulate ceramic phase and which was fired at 900° C., with Example 18, wherein again SiC comprised the particulate ceramic phase, but which was fired at 750° C., is of special interest Thus, the higher sintering temperature gave rise to a foam body whereas a dense body can be prepared at lower firing temperatures.

Although the above laboratory work was directed to forming bulk bodies, it will be recognized that the inventive materials can be used as coatings on high temperature refractory ceramics and metals.

Based upon an overall matrix of physical properties, the glass-ceramic-bonded Al$_2$O$_3$ composite comprising Example 12 sintered at 1300° C. for four hours is deemed to constitute the most preferred embodiment of the inventive glasses.

I claim:

1. A sintered glass-ceramic-bonded ceramic composite article consisting essentially of hard refractory ceramic particulates bonded together by a glass-ceramic, the ratio of ceramic particulates to glass-ceramic bonding material ranging from 90% ceramic:10% glass-ceramic to 30% ceramic: 70% glass-ceramic, said glass-ceramic containing a divalent metal borate crystal phase and being thermally crystallized in situ from a glass consisting essentially, expressed in terms of weight percent on the oxide basis, of 25–65% B$_2$O$_3$, 20–75% RO, wherein RO consists of at least one divalent metal oxide selected fromm the group consisting of CaO, SrO, BaO, MnO, and ZnO, the sum of B$_2$O$_3$+RO constituting at least 55% of the total composition, and up to 45% total of optional ingredients in the indicated proportions selected from the group consisting of up to 20% SiO$_2$, up to 10% F., up to 10% ZrO$_2$, up to 40% Al$_2$O$_3$, and up to 10% La$_2$O$_3$+Y$_2$O$_3$+CeO$_2$+PbO+TiO$_2$ consisting up to 10% La$_2$O$_3$, up to 10% Y$_2$O$_3$, up to 10% CeO$_2$, up to 10% PbO and up to 10% TiO$_2$.

2. A composite article according to claim 1 wherein said hard refractory ceramic particulates are selected from the group consisting of Al$_2$O$_3$, cordierite, SiC, Si$_3$N$_4$, TiB$_2$, TiN, and ZrO$_2$.

3. A composite article according to claim 2 wherein Al$_2$O$_3$ constitutes said hard refractory ceramic particulates and said glass-ceramic contains crystals of a divalent metal aluminoborate.

4. A composite article according to claim 2 having a foam structure wherein SiC constitutes said hard refractory ceramic particulates.

5. A composite article according to claim 1 wherein, when Al$_2$O$_3$ is present in said glass in an amount in excess of 20%, at least 2% F. and/or 10% SiO$_2$ will be included.

6. A composite article according to claim 1 wherein said glass contains Al$_2$O$_3$ such that said glass-ceramic contains crystals of a divalent metal aluminoborate.

* * * * *